(12) United States Patent
Kister et al.

(10) Patent No.: US 7,979,946 B2
(45) Date of Patent: Jul. 19, 2011

(54) POLISH AND POLISHING MITTS

(75) Inventors: Mary E. Kister, Cumming, GA (US);
Charlene B. Dunbar, Lilburn, GA (US);
Michael L. Gross, Atlanta, GA (US);
Mark Foreste, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1151 days.

(21) Appl. No.: 11/640,479

(22) Filed: Dec. 15, 2006

(65) Prior Publication Data

US 2008/0145131 A1 Jun. 19, 2008

(51) Int. Cl.
*A47L 13/19* (2006.01)
(52) U.S. Cl. ............ 15/104.94; 15/227; 15/229.8; 401/7
(58) Field of Classification Search ............... 15/104.94, 15/227, 104.93, 161, 229.8; 401/7
See application file for complete search history.

(56) References Cited

U.S. PATENT DOCUMENTS

| | | | |
|---|---|---|---|
| 2,292,323 A | 8/1942 | Ingle | |
| 3,217,353 A | 11/1965 | Karcher et al. | |
| 3,423,266 A | 1/1969 | Davies et al. | |
| 3,563,941 A | 2/1971 | Plueddemann | |
| 3,595,665 A | 7/1971 | Huitson et al. | |
| 3,595,731 A | 7/1971 | Davies et al. | |
| 3,777,328 A | 12/1973 | Kaplan | |
| 4,041,203 A | 8/1977 | Brock et al. | |
| 4,720,415 A | 1/1988 | Vander Wielen et al. | |
| 4,766,029 A | 8/1988 | Brock et al. | |
| 4,770,878 A | 9/1988 | Thomas | |
| 4,804,413 A | 2/1989 | Lee | |
| 4,806,353 A | 2/1989 | Thomas | |
| 4,847,067 A | 7/1989 | Thomas | |
| 5,094,839 A | 3/1992 | Lowder et al. | |
| 5,145,727 A | 9/1992 | Potts et al. | |
| 5,149,576 A | 9/1992 | Potts et al. | |
| 5,169,706 A | 12/1992 | Collier et al. | |
| 5,178,931 A | 1/1993 | Perkins et al. | |
| 5,226,992 A | 7/1993 | Morman | |
| 5,272,236 A | 12/1993 | Lai et al. | |
| 5,278,272 A | 1/1994 | Lai et al. | |

(Continued)

FOREIGN PATENT DOCUMENTS

IE 940750 5/1995

(Continued)

OTHER PUBLICATIONS

PCT International Search Report for Application No. PCT/IB2007/053379, completed Feb. 19, 2008, mailed Apr. 6, 2008, 17 pages.

*Primary Examiner* — Shay L Karls
(74) *Attorney, Agent, or Firm* — Dority & Manning, P.A.

(57) ABSTRACT

A polish having improved properties is generally disclosed. In one embodiment, the polish can include a preservative that resists the growth of organisms, such as mold, fungus, bacteria, and the like, even after extended periods of nonuse. Additionally, the polish can be incorporated or impregnated into a mitt to form an all in one treating device. For example, the all in one treating device can be impregnated with a polish in at least one surface. In one embodiment, the polish can resist wicking or other migration from its application area to other parts of the all in one treatment device.

21 Claims, 2 Drawing Sheets

U.S. PATENT DOCUMENTS

| | | | | |
|---|---|---|---|---|
| 5,332,613 | A | 7/1994 | Taylor | |
| 5,336,545 | A | 8/1994 | Morman | |
| 5,382,400 | A | 1/1995 | Pike et al. | |
| 5,464,688 | A | 11/1995 | Timmons et al. | |
| 5,502,946 | A | 4/1996 | Storandt | |
| 5,539,056 | A | 7/1996 | Yang et al. | |
| 5,557,006 | A * | 9/1996 | Tegeler et al. | 560/105 |
| 5,565,584 | A * | 10/1996 | Tegeler et al. | 549/551 |
| 5,571,923 | A * | 11/1996 | Tegeler et al. | 548/248 |
| 5,596,052 | A | 1/1997 | Resconi et al. | |
| 5,932,497 | A | 8/1999 | Morman et al. | |
| 6,015,764 | A | 1/2000 | McCormack et al. | |
| 6,037,281 | A | 3/2000 | Mathis et al. | |
| 6,111,163 | A | 8/2000 | McCormack et al. | |
| 6,114,024 | A | 9/2000 | Forte | |
| 6,132,786 | A | 10/2000 | Poulos et al. | |
| 6,241,580 | B1 * | 6/2001 | Fisher | 451/28 |
| 6,309,736 | B1 | 10/2001 | McCormack et al. | |
| 6,311,357 | B1 | 11/2001 | Horian | |
| 6,315,482 | B1 * | 11/2001 | Girardot et al. | 401/266 |
| 6,325,565 | B1 * | 12/2001 | Girardot et al. | 401/266 |
| 6,355,289 | B1 | 3/2002 | Rolow et al. | |
| 6,461,457 | B1 | 10/2002 | Taylor | |
| 6,494,767 | B2 * | 12/2002 | Fisher | 451/28 |
| 6,908,608 | B1 | 6/2005 | Huglin et al. | |
| 7,094,743 | B2 | 8/2006 | Thioliere et al. | |
| 2001/0048841 | A1 * | 12/2001 | Girardot et al. | 401/266 |
| 2003/0235607 | A1 | 12/2003 | Buck | |
| 2004/0170729 | A1 | 9/2004 | Xavier et al. | |
| 2004/0175434 | A1 | 9/2004 | Schasteen et al. | |
| 2004/0242706 | A1 | 12/2004 | Wiersema et al. | |
| 2004/0244132 | A1 * | 12/2004 | Ouellette et al. | 15/227 |
| 2005/0229349 | A1 * | 10/2005 | Foser | 15/227 |
| 2005/0241089 | A1 * | 11/2005 | Brunner et al. | 15/104.94 |
| 2005/0244211 | A1 | 11/2005 | Brunner et al. | |
| 2006/0008496 | A1 | 1/2006 | Kulkarni et al. | |
| 2006/0008513 | A1 | 1/2006 | Holbert et al. | |
| 2006/0218736 | A1 * | 10/2006 | Oberstadt et al. | 15/104.94 |

FOREIGN PATENT DOCUMENTS

| | | |
|---|---|---|
| WO | WO 9324835 | 12/1993 |

* cited by examiner

POLISH AND POLISHING MITTS

BACKGROUND

Various combinations of articles have been used for the cleaning, buffing and polishing of hard surfaced materials. Cleaning and polishing "kits" may typically comprise three separate components. For example, such kits may comprise a container, such as a bottle or tin, to hold the cleaning composition or polishing composition, an applicator to deliver the composition to the hard surface and to spread the composition on the surface, and a polishing article used to remove a cleaning composition and/or buff a polishing composition into the surface while removing excess polishing composition. As a specific example, a shoe polishing "kit" may consist of a tin or other container of shoe wax or polish, a small brush, a sponge or a first cloth to be used as the polish applicator, and a second larger brush or second cloth to be used for polishing or buffing the waxed shoe surface to a shiny appearance.

However, such cleaning/polishing kits as described above are bulky and consume valuable space, particularly when a user is traveling and the actual need is only for a small touch-up application of cleaner and/or polish to attend to a surface blemish obtained during travel. Also, it is possible for one or more of the various components of such cleaning or polishing kits to become separated and lost from the others, rendering the kit essentially useless. Furthermore, such cleaning/polishing kits are designed for many instances of use, and where the kit is only infrequently used the cleaning and/or polishing composition is subject to spoilage or desiccation, such that only a few uses are obtained before the remainder of the kit must be discarded as waste. Also, with infrequent use, the applicator may become encrusted with desiccated residual amounts of the polish and so become stiff and unusable.

Recently, all in one treating devices capable of holding or containing an impregnated polish, such as a cleaning and/or polishing composition, have been disclosed. The all in one treating device can deliver the polish to a surface to be cleaned and/or polished and/or otherwise treated, and then be utilized to buff or polish the surface. The mitt may also be utilized to deliver a polish that is intended to be delivered to or spread upon a surface and then allowed remain upon the surface as a temporary or permanent treatment.

However, these all in one treatment devices can be subject to several drawbacks. For example, mold, fungus, or other organisms can grow in and/or on the all in one treatment device, especially when left unused for an extended period (e.g., several months), since the polish is applied and stored or packaged in a wet or damp state. Alternatively, or additionally, the impregnated polish can wick, or otherwise migrate, to undesirable areas of the mitt, such as bond lines, nonbuffing areas, etc.

As such, a need exists for a polish that resists mold, fungus, or other growth, even after an extended period of non-use, and even if applied to or impregnated within a mitt. Also, a need exists for an all in one treatment device having an impregnated treatment composition that does not substantially wick, or otherwise migrate, to undesired locations on the treatment device.

SUMMARY

Objects and advantages of the invention will be set forth in part in the following description, or may be obvious from the description, or may be learned through practice of the invention.

In general, the present disclosure is directed to, in one embodiment, an all in one treating device comprising a hollow member and a polish. The hollow member has an open end adapted for the insertion of one or more fingers, such as one or more fingers. The hollow member can be defined between a first sheet layer and a second sheet layer. The first sheet layer can include an elastic layer, and the second sheet layer can include a fibrous nonwoven web layer having an outer surface. The polish can be applied to at least a portion of the outer surface of the fibrous nonwoven web of the second sheet layer.

The polish can comprise a preservative configured to inhibit the growth of mold, and can be present in said polish in an amount of about 1% by weight to about 5% by weight. In some embodiments, the preservative can include a paraben (such as methylparaben) and/or an alkanoic acid (such as propanoic acid).

In the alternative, or in addition to, the polish can include a viscosity modifier in an amount sufficient to modify the viscosity of said polish to be between about 30,000 cps and about 150,000 cps, such as from about 70,000 cps to about 80,000 cps. In one embodiment, the viscosity modifier can include an acrylamide.

In still another embodiment, an applicator coating can be present on the outer surface of the fibrous nonwoven web of the second sheet layer. For instance, the applicator coating can include a polytetrafluoroethylene compound.

In yet another embodiment, the present invention is directed to a shoe polish including at least one wax, a viscosity modifier, and a preservative. The viscosity modifier can be present in the shoe polish in an amount sufficient to modify the viscosity of the shoe polish to be between about 30,000 cps and 80,000 cps. The preservative can be configured to inhibit the growth of mold, and can include a paraben present in the shoe polish in an amount of between about 1% by weight and about 5% by weight.

In another embodiment, the present invention is generally directed to a method of making an all in one treating device. The method can include providing a first sheet layer comprising an elastic layer. A second sheet layer comprising a fibrous nonwoven web layer having an outer surface is also provided. The first sheet layer can be joined to the second sheet layer at bond lines to form a hollow member having an open end. A polish can be applied to the outer surface of the second sheet layer. The polish can include at least one wax, a viscosity modifier, and a preservative configured to inhibit the growth of mold. For example, the preservative can be selected from the group consisting of parabens and alkanoic acids. In one embodiment, an applicator layer can be applied to the outer surface of the second sheet layer before applying the polish.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION OF PREFERRED EMBODIMENTS

Figure 1:
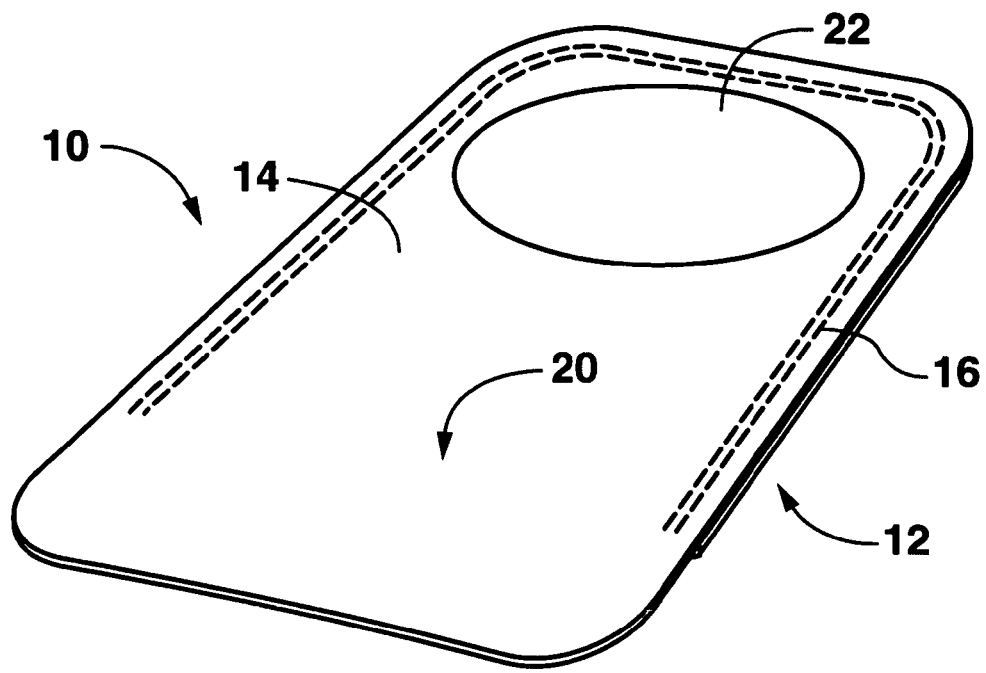
FIG. 1 is a representation of an exemplary all in one treating device.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

In general, a polish having improved properties is disclosed. In one embodiment, a polish is disclosed that can resist the growth of organisms, such as mold, fungus, bacteria, and the like, even after extended periods of nonuse. In one particular embodiment, the polish can be impregnated into, or otherwise applied to a mitt to form an all in one treating device. For example, the all in one treating device can be impregnated with a polish in at least one surface. The polish can resist the growth of mold, fungus, bacteria, and the like after impregnation into the all in one treating device, even after the all in one treating device is stored for an extended period, either prior to use or between uses.

The polish can include a preservative configured to inhibit growth of mold or fungus over a period of time. Suitable preservatives can include, but are not limited to, parabens, alkanoic acids, and combinations thereof. In general, parabens are esters of para-hydroxybenzoic acid. The general chemical structure of a paraben is as follows:

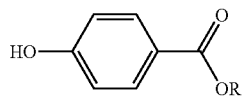

wherein R represents an alkyl group. For instance, a paraben preservative can be, without exception, methylparaben, ethylparaben, propylparaben, butylparaben, isobutylparaben, isopropylparaben, benzylparaben, and their respective salts.

Generally, alkanoic acids are carboxylic acids with alkane, alkene, or similar substituents. The preferred alkanoic acid is propanoic acid. Other suitable alkanoic acids include but are not limited to methanoic, ethanoic, 2-methylbutanoic, 2-methylpropanoic, 2,2 dimethylpropanoic, decanoic, octanoic, 2-hexenoic, heptanoic, 6-methylheptanoic, 3-ethylpentanoic, 3-chloropentanoic, 2-hydroxypropanoic, 2-chloro-4-hydroxyhexanoic, hexanedioic, octadecanoic, 4-oxopentanoic, and 6-hydroxy-4-oxonanoic acids.

However, many alkanoic acids can have an undesirable properties. For example, alkanoic acids can give off unpleasant odors. As such, paraben based preservatives are generally preferred. Additionally, parabens are preferred preservatives due to their superior ability to inhibit growth of common airborne mold spores in the polish.

The preservative can be present in the shoe polish composition in an amount effective to inhibit the growth of mold and/or fungus in the polish even over an extended period, such as several days, weeks, months, or even years. For example, a preservative can be present in the polish in at least about 1% by weight, such as from about 1% by weight to about 5% by weight. In one embodiment, for instance, a preservative can be present in the polish from about 2% by weight to about 4% by weight, such as about 3% by weight.

Also, in one embodiment, the polish can resist migration or wicking into undesired areas of an all in one treating device, such as the seams. For example, a thickener can be included in the polish to help prevent the polish from migrating or wicking after it is applied to an all in one treating device, even after an extended period. For instance, the polish's viscosity can be increased by adding an appropriate amount of a viscosity modifier or thickener in order to prevent migration or wicking of the polish after its application to a mitt or an all in one treating device. However, if the viscosity of the polish is too high, then polish cannot be economically applied to a mitt on a mass manufacturing scale.

In one embodiment, the present inventors have found that a polish having a viscosity of between greater than about 30,000 centipoise (cps), such as greater than about 50,000 cps, or greater than about 70,000 cps. However, as the viscosity increases the ability to apply or impregnate a mitt with the polish on a mass manufacturing scale can become more difficult. As such, a polish having a viscosity of between about 30,000 cps and about 150,000 cps, such as between about 50,000 cps and 120,000 cps, is particularly suitable for both resisting undesired wicking, while still allowing the polish to be applied to a mitt on a mass manufacturing scale. For instance, the polish can have a viscosity of about 70,000 cps to about 80,000, about 72,500 cps to about 77,500 cps, or about 75,000 cps.

Some non-limiting examples of suitable viscosity modifiers include, but are not limited to, hydroxypropyl cellulose, such as Klucel® (Aqualon division, Hercules, Inc.); xanthan gum, such as Kelzan® (CP Kelco, Atlanta); and acrylamide such as Solagum® (Seppic, Inc. New Jersey).

In most embodiments, the viscosity modifier can be present up to about 5% by weight in the polish, such as from about 1% by weight to about 4% by weight. For instance, in one embodiment, the viscosity modifier can be present in the polish from about 2% by weight to about 3% by weight.

The polish can be any type of polish, such as leather and shoe polishes. In general, a shoe polish is applied to the leather of a shoe for cleaning, conditioning, protecting, shining the shoe. Shoe polishes can include, but are not limited to, those that are oil based and those that are based on an aqueous phase (emulsion based products). Examples of oil based shoe care products are shoe creams and shoe polishes. In most embodiments, the shoe polish includes at least one type of wax, either natural or synthetic. Typically, a wax is a type of lipid that may be an ester of ethylene glycol(ethan-1,2-diol) and two fatty acids. It may also be a combination of other fatty alcohols with fatty acids. Natural waxes can include, but are not limited to, carnauba wax, bees wax, lanolin, paraffin wax, and combinations thereof. Synthetic waxes can include, but are not limited to, polyethylene waxes, Fischer-Tropsch waxes, substituted amide waxes, chemically modified waxes, polymerized α-olefins, and combinations thereof.

Also, no matter what type or mixture of waxes are present in the shoe polish, the shoe polish may, in most embodiments, further include a coloring agent. Additionally, other additives may also be present in the shoe polish, such as soaps, conditioners, emulsifiers, aroma compounds, pH modifiers, buffers, etc.

The polish can be impregnated into, or otherwise applied to, a mitt to form an all in one treating device. The all in one treating device may be usefully employed to deliver or apply a cleaning, waxing, polishing and/or other polish to the surface, and then also utilized to buff the surface in order to clean the surface and/or polish it. Alternatively, the all in one treating device may be utilized to deliver a polish that is intended to be delivered to or spread upon a surface to be treated, and then allowed remain upon the surface as a temporary or longer-term treatment, or even a permanent surface treatment.

Any mitt can be used to form the all in one treatment device. Generally speaking, a suitable mitt used to form the all in one treating device can be a hollow member which has an open end that is adapted for the insertion of one or more fingers of a user. The hollow member is defined between a first sheet layer and a second sheet layer, and the first and second sheet layers are bonded together along at least a substantial portion of the periphery of the mitt, except leaving one open end for finger insertion, to form the hollow member.

It is anticipated that in use the mitt will be subjected to vigorous rubbing motions, both as the user delivers the polish to the surface and then, if desired, as the user proceeds to buff the surface to clean and/or polish it. Thus, it may be desirable for the mitt to allow for the insertion of more than one finger, such as two fingers or three fingers, since the additional fingers may facilitate the all in one treating device's ease of use.

Additionally, the first sheet layer preferably comprises an elastic layer such that when the first and second sheet layers of the mitt are bonded together to define the hollow member, the insertion of a finger(s) into the mitt should, at least to a small degree, stretch or elongate the elastic layer of the first sheet layer. Because elastic materials have the dual properties of stretchability and recovery, the recovery force of the elastic layer will maintain a certain amount of tension on the fingers of the user. Therefore, the elastic layer acts to make the mitt more form-fitting, and helps to keep the mitt in place on the fingers of the user during vigorous rubbing.

The elastic layer may be a single layer such as an elastic cast film layer, blown film layer, elastic foam layer, elastic strand layer, or fibrous elastic layer (such as an elastic meltblown layer or an elastic spunbond layer). In general, the elastic layer may have a basis weight of from about 7 grams per square meter (gsm) or less to about 68 gsm, or greater. More desirably, the elastic layer may have a basis weight from about 7 gsm or less to about 34 gsm. Because elastic materials are often expensive to produce, the elastic layer is desirably of as low basis weight as is possible while still providing the desired properties of stretch and recovery to the first sheet layer.

Many elastomeric polymers are known to be suitable for forming fibers, strands, foams and films. Elastic polymers useful may be any suitable elastomeric fiber or film forming resin including, for example, elastic polyesters, elastic polyurethanes, elastic polyamides, elastic co-polymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly(vinyl arene) and where B is an elastomeric polymer midblock such as a conjugated diene or a lower alkene polymer such as for example polystyrene-poly(ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly-(ethylene-propylene) or SEPSEP block copolymer. These A-B-A' and A-B-A-B copolymers are available in several different formulations from Kraton Polymers of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from the Exxon Mobil Chemical Company of Houston, Tex., as well as blends. It may also be desirable for the elastic layer to be breathable, capable of passing vapors and/or gases, and breathable microporous elastic films containing fillers as are described in, for example, U.S. Pat. Nos. 6,015,764 and 6,111,163 to McCormack and Haffner, U.S. Pat. No. 5,932,497 to Morman and Milicevic, and in U.S. Pat. No. 6,461,457 to Taylor and Martin, all incorporated herein by reference in their entireties, may desirably be utilized.

Elastic layers, whether selected from films, foams, strands or fibrous layers, may have unpleasant tactile aesthetic properties, such as feeling rubbery or tacky to the touch, making them unpleasant and uncomfortable against the skin of the user. Fibrous webs produced from non-elastic polymers, on the other hand, often have better tactile, comfort and aesthetic properties, feeling smoother and less tacky in skin-contacting uses. The tactile aesthetic properties of the elastic layer of the first sheet layer can therefore be improved by "facing" the elastic layer, that is, by forming a laminate of the elastic layer with one or more non-elastic, extensible materials, such as nonwoven fibrous webs, on the surface of the elastic layer which is to contact the user's skin. In addition, because the elastic layer by itself may have low resistance to rupturing or tearing, especially if forces are applied in a direction perpendicular to the plane of the elastic layer, it may be highly desirable to face the elastic layer of the first sheet layer with one or more non-elastic fibrous layers in order to provide additional structural integrity to the first sheet layer and help reduce possible in-use tears of the first sheet layer. Such a fibrous facing layer may be any fibrous layer capable of extension in at least one direction, such as nonwoven web materials, textile materials or knitted materials. However, for ease and speed of production and due to their relatively low cost, nonwoven web materials are highly suitable for use in the first sheet layer as a facing layer to the elastic layer, where such one or more facing layers are desired. A facing layer may desirably be joined or bonded to the elastic layer by such methods as are known in the art, for example by thermal bonding, adhesive bonding, ultrasonic bonding and the like, or by extrusion lamination where the fibrous facing layer is joined to the elastic layer just after extrusion of the elastic layer, while the elastic polymer of the elastic layer is still in a molten or semi-molten state.

Polymers suitable for making a fibrous facing layer include those polymers known to be generally suitable for making nonwoven webs such as spunbond, meltblown, carded webs and the like, and include for example polyolefins, polyesters, polyamides, polycarbonates and copolymers and blends thereof. It should be noted that the polymer or polymers may desirably contain other additives such as processing aids or treatment compositions to impart desired properties to the filaments, residual amounts of solvents, pigments or colorants and the like.

Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include poly(lactide) and poly(lactic acid) polymers as well as polyethylene terephthalate, polybutylene terephthalate, polytetramethylene terephthalate, polycyclohexylene-1,4-dimethylene terephthalate, and isophthalate copolymers thereof, as well as blends thereof.

Nonwoven fibrous webs formed from non-elastic polymers such as, for example, polyolefins are generally considered non-elastic. This lack of elasticity may restrict these nonwoven web materials to applications where elasticity is not required or desirable. When non-elastic nonwoven webs are laminated to an elastic layer, the resulting laminate material may also be too restricted in its elastic properties. Therefore, where it is desirable to face the elastic layer with one or more non-elastic material layers, care should be taken to use a non-elastic material which is at least somewhat extensible in the direction of desired stretch and recovery of the first sheet layer. For example, carded webs of staple fibers as are known in the art are generally known to have considerably greater fiber orientation in the machine direction or "MD" than in the cross machine direction or "CD". Because more of the fibers are aligned in the MD, the carded web tends to have more extensibility in the CD than in the MD. In addition, utilizing low basis weights for a nonwoven web selected as a facing material may allow for greater extensibility, whether such nonwoven web layer is a spunbond web, a meltblown web, a carded web, etc.

Generally speaking, the basis weight of a nonwoven web facing layer may be from about 7 gsm or less up to 68 gsm or more; however, in order to reduce cost of the overall device for treating surfaces it is desirable to use the lightest weight of facing material capable of producing the desired aesthetic and/or structural result. More particularly, a facing layer used in the first sheet layer may have a basis weight from about 7 gsm or less to about 34 gsm, and still more particularly, from about 7 gsm to about 21 gsm. Other embodiments are possible. For example, where the primary reason for facing the elastic layer with a non-elastic layer is to avoid the tacky feel of the elastomer, the elastic layer may be faced with a light "dusting" of meltblown fibers produced from non-elastic polymer, and such dustings of meltblown fibers may be substantially lower in basis weight, such as 5 gsm, 3 gsm, 2 gsm or lighter.

Other laminate materials which include the elastic layer of the first sheet layer may be desirable. For example, elastic laminate materials of elastic and non-elastic materials have also been made by bonding the non-elastic material or web to an elastic material in a manner that allows the entire laminate or composite material to stretch or elongate so it can be used in disposable products. In one such laminate material, disclosed, for example, by Vander Wielen et al. U.S. Pat. No. 4,720,415, incorporated herein by reference in its entirety, a non-elastic web material is bonded to an elastic material while the elastic material is held stretched, so that when the elastic material is relaxed, the non-elastic web material gathers between the bond locations, and the resulting elastic laminate material is stretchable to the extent that the non-elastic web material gathered between the bond locations allows the elastic material to elongate.

In another such elastic laminate material, disclosed for example by U.S. Pat. Nos. 5,336,545, 5,226,992, 4,981,747 and 4,965,122 to Morman, all incorporated herein by reference in their entireties, the non-elastic web material is necked (that is, is elongated in one direction, usually the machine direction, causing rugosities to form across the web) and is joined to the elastic material while in the non-elastic material is in the necked or elongated condition. The non-elastic material is then able to be extended in the direction perpendicular to the direction of necking, allowing for extensibility of the laminate. Such laminates may be referred to as "necked bonded laminates" or "NBL".

When utilizing any of the above-mentioned elastic laminate materials as the elastic layer of the first sheet layer, in order to achieve the desired aesthetic and skin comfort properties it is desirable that the side of the elastic layer which is faced with the fibrous web material be oriented toward the inside surface of the hollow member of the mitt. However, such elastic laminate materials are also known to be made in tri-laminate or multi-layer laminate form, that is, wherein the elastic layer is faced on each side with one or more fibrous web materials. Such other laminate forms are also highly suitable for use in or as the first sheet layer and it may be desired to also have the outside-facing side of the first sheet layer faced with a non-elastic fibrous layer to avoid the possibility of the elastic layer sticking to other surfaces such as other mitts or the packaging in which and individual mitt is provided.

Additionally, or alternatively, a non-slip adhesive may be applied to the inside surface of the first sheet layer, to inhibit the fingers of the user from slipping out of the hollow member during use. Use of a non-slip coating may also help prevent slippage during, for example, vigorous side-to-side or lateral motions as during buffing. Suitable adhesives include melt-applied adhesives and tackifying resins which will act to increase the coefficient of friction of the surface of the sheet layer, or otherwise act to reduce slippage between a user's fingers and the sheet layer in use. An example of an adhesive or tackifying additive may desirably be such as the REXTAC® adhesive polymers available from Huntsman Polymers of Houston, Tex. Other suitably useful slip-reducing additives will be known to those of skill in the art. Such additives may desirably be applied by spraying, melt spraying, slot coating, and the like, or by other methods known in the art.

In addition, where the outside-facing side of the first sheet layer is faced with a non-elastic fibrous layer, the user of the mitt may optionally utilize this outside-facing side of the first sheet layer as an additional or optional cleaning or buffing surface, if desired.

As stated, the device for treating surfaces further comprises a second sheet layer having at least one fibrous nonwoven web layer. The fibrous nonwoven web layer is an outer layer of the mitt and has an outer surface, and should be capable of accepting a polish, and later delivering at least some of the polish to the surface which is to be cleaned and/or polished and/or otherwise treated by the user of the mitt. By "outer surface" what is meant is that the device has an exposed outwardly-facing surface when configured for use, and this is not meant to exclude the embodiments described herein wherein the device is enclosed in removable packaging, or wherein the outer surface is temporarily covered during storage, such as in the folded embodiments described herein.

In addition to holding and delivering the polish, the fibrous nonwoven web layer is also intended to be suitable for use in buffing the desired surface to be treated or cleaned or polished, if further buffing is desired. Suitable fibrous nonwoven web layers for use in the second sheet layer include the fibrous webs discussed above, such as spunbond nonwoven webs of substantially continuous filaments or fibers and bonded carded webs of staple length fibers. Generally, the second sheet layer and/or the fibrous nonwoven web layer comprised by the second sheet layer may have a basis weight of from about 7 gsm or less to about 340 gsm, or even greater. The basis weight selected for the fibrous nonwoven web layer will depend on a number of factors, including the type and amount of polish desired to be delivered, the types of surfaces desired to be cleaned and/or polished and/or otherwise treated with an embodiment of the mitt, etc. More desirably, the fibrous nonwoven web layer may have a basis weight from about 17 gsm to about 170 gsm, and still more desirably from about 17 gsm to about 100 gsm. The fibers of the fibrous nonwoven web layer may be mono-or multicomponent, multiconstituent, crimped or uncrimped, be substantially round in cross section or be shaped fibers, or be mixtures of any of the foregoing.

The characteristics or physical properties of fibrous nonwoven webs are controlled, at least in part, by the density or openness of the fabric. Generally speaking, fibrous nonwoven webs made from crimped filaments or fibers have a lower density, higher loft and improved resiliency compared to similar nonwoven webs of uncrimped filaments. Such a lofty, low density fibrous nonwoven web layer may be particularly desirable for use in the second sheet layer depending on the ultimate purpose of the device for treating surfaces and/or the type of polish to be used with the mitt.

By way of example, where the polish selected is a low viscosity fluid such as, for example, an aqueous or alcohol based cleaning composition, a denser or flatter, less lofty fibrous nonwoven web layer may suffice. However, for other uses a less dense or more lofty structure fibrous nonwoven web layer, one having a more open volume structure, may be more desirable. For example, a more lofty structure may be particularly desirable where the polish to be delivered to the surface is desired to be a heavier composition such as a high viscosity fluid or a paste, or various waxes, or polishing compounds, or where it is desirable to deliver larger amounts of cleaning or polishing compounds than can be contained within the web structure of a less lofty nonwoven web.

Various methods of crimping melt-spun multicomponent filaments are known in the art. As disclosed in U.S. Pat. Nos. 3,595,731 and 3,423,266 to Davies et al., incorporated herein by reference in their entireties, bicomponent fibers or filaments may be mechanically crimped and the resultant fibers formed into a nonwoven web or, if the appropriate polymers are used, a latent helical crimp produced in bicomponent fibers or filaments may be activated by heat treatment of the formed web. Alternatively, as disclosed in U.S. Pat. No. 5,382,400 to Pike et al., incorporated herein by reference in its entirety, the heat treatment may be used to activate the latent helical crimp in the fibers or filaments before the fibers or filaments have been formed into a nonwoven web. In addition, lofty fibrous nonwoven web layers may be desirable for use in the second sheet layer where it is desired to emboss or otherwise impart surface characteristics to the outer facing surface of the second sheet layer.

Bonding of the fibrous nonwoven web layer which is to be used in the second sheet layer may be performed by any method known to be suitable for bonding such nonwoven webs, such as for example by thermally point-bonding or spot-bonding the nonwoven web as described above. Alternatively, where the fibers are multicomponent fibers having component polymers with differing melting points, through-air bonders such as are well known to those skilled in the art may be advantageously utilized. Generally speaking, a through-air bonder directs a stream of heated air through the web of continuous multicomponent fibers thereby forming inter-fiber bonds by desirably utilizing heated air having a temperature at or above the polymer melting temperature of a lower melting polymer component and below the melting temperature of a higher melting polymer component. As still other alternatives, the fibrous nonwoven web layer may be bonded by utilizing other means as are known in the art such as for example adhesive bonding, ultrasonic bonding or entanglement bonding such as hydroentangling or needling. While the type of bonding utilized is not critical, because the intended use for the mitt is rubbing the outer surface of the second sheet layer against other surfaces to be cleaned and/or polished and/or otherwise treated, it is important that the fibrous nonwoven web layer be bonded or consolidated sufficiently to avoid excess abrading or "fuzzing" of the fibrous nonwoven web layer during such rubbing or buffing.

The mitt may also desirably include a liquid barrier material capable of preventing flow-through of the polish onto a user's fingers. Where a liquid barrier material is used it should be positioned between the user's fingers and the fibrous nonwoven web layer of the second sheet layer. Suitable liquid barrier materials include cast and blown polymeric films, which may also suitably be breathable films, and nonwoven web materials such as spunbond layers and meltblown layers as are known in the art and are described above. Other suitable barrier materials include metal foil materials, polymer coated metal foils, and metalized polymer films. The basis weight of barrier material may be from about 7 gsm or less up to 68 gsm or more; however, in order to reduce cost of the overall mitt it is desirable to use the lightest weight of barrier material which is necessary for preventing or substantially reducing flow-through of polish. More particularly, a layer of barrier material may have a basis weight from about 7 gsm or less to about 34 gsm, and still more particularly, from about 7 gsm to about 21 gsm. Other embodiments are possible. For example, where the desired polish is a heavy or viscous fluid, or a wax or paste, that is, a polish having less tendency to flow, the requirements for a barrier material may be minimal and in such situations the barrier function may be provided for by only a light "dusting" of meltblown fibers of 17 gsm or less. Depending on need, such dustings of meltblown fibers may be substantially lower in basis weight and ranging from about 2 gsm to about 15 gsm.

On the other hand, where the treating composition desired is of lower viscosity or is a low surface tension fluid or otherwise has a higher tendency to flow, the requirements for a barrier material may be more strenuous and use of polymeric films, metalized films, metal foils or polymeric coated metal foils may be desirable. Care should also be taken to match the requirements of the barrier material to the chemistry of the treating composition or compositions selected. For example, polyolefin films tend to be oleophilic, that is, tend to have an affinity for oils, and therefore may be less well suited to a treating composition which includes oils or petroleum extract products. For such a treating composition, a metal film or foil or metalized polymer foil may be more resistant to bleed-through of the treating composition. For example, leather polishes and waxes such as may be used to polish shoes or other footwear, and wood polishes and waxes for cleaning and polishing wooden furniture or wooden flooring often contain oils and/or petroleum extracts. In addition, use of a high barrier material may avoid migration of a liquid portion of the treating composition (either in liquid form or vapor form as by evaporation) to other portions of the device during on-shelf storage.

While the liquid barrier material may be provided as a layer situated between the first sheet layer and the second sheet layer, it may be more desirable to have the liquid barrier material incorporated into or bonded onto the second sheet layer itself, so as to avoid the possibility of accidental finger insertion on the wrong side of the barrier layer, i.e. between the second sheet layer and the barrier layer. Therefore, the liquid barrier material may be provided to the second sheet layer as a laminate material wherein the laminate material incorporates both the fibrous nonwoven web layer and the liquid barrier material. Where the liquid barrier material is a fibrous web, such as a meltblown layer, such a laminate may desirably comprise only the fibrous nonwoven web layer and the meltblown liquid barrier material.

Such a laminate construction of the second sheet layer may desirably further comprise a skin-contacting layer or facing layer having more cloth-like aesthetic characteristics than meltblown webs, foils or films selected as the barrier material, in which case the laminate may be provided as a three (or more) layer laminate comprising the fibrous nonwoven web layer and a skin-contacting layer with the meltblown, foil or film liquid barrier material interposed between. The skin contacting layer may be any material layer provided to reduce the tacky feel of the barrier material against the skin, and may be such as those described above with respect to the skin contacting/facing layer which may be used in the first sheet layer. Such multilayer laminates of the second sheet layer including the fibrous nonwoven web layer may be bonded together by methods as are known in the art and discussed above, such as by thermal point bonding, point unbonding, adhesive bonding, ultrasonic bonding and the like. Particular examples of multilayer laminate construction for the second sheet layer include spunbond-film-spunbond laminates as are known in the art and spunbond-meltblown-spunbond laminates such as are described in U.S. Pat. Nos. 4,041,203 and 4,766,029 to Brock et al., U.S. Pat. No. 5,464,688 to Timmons et al. and U.S. Pat. No. 5,169,706 to Collier et al., all of which are incorporated herein by reference in their entireties.

As was mentioned, it may be desirable for a barrier layer to be breathable, that is, to act as a barrier to passage of liquids yet allow the passage of water vapor and/or gases. A liquid barrier layer which is also breathable may provide increased in-use comfort to the user by allowing passage of water vapor. Nonwoven barrier materials such as meltblown barrier layers are generally capable of allowing passage of water vapor and gasses but film materials may act as a barrier to these as well. However, breathable films may be used such as are known in the art, such as microporous filled films and breathable monolithic films. Exemplary breathable films and film-nonwoven laminate materials are described in, for example, U.S. Pat. No. 6,114,024 to Forte, U.S. Pat. No. 6,309,736 to McCormack et al, and U.S. Pat. No. 6,037,281 to Mathis et al., all incorporated herein by reference in their entireties.

It should further be noted that the fibrous nonwoven web layer, whether provided to the second sheet layer as a laminate with a liquid barrier material or not, may itself be a multi-layer structure. For example, a spunbond fibrous nonwoven web layer may be produced on a multi-spin bank machine where a subsequent spin bank deposits fibers atop a layer of just-deposited fibers from a previous spin bank. In this situation, the various layers of deposited fibers in the fibrous nonwoven web layer may be the same, or they may be different in basis weight and/or in terms of the composition, type, size, level of crimp, and/or shape of the fibers produced. As another example, the fibrous nonwoven web layer may be provided as two or more individually produced layers of spunbond, carded web, etc. which have been bonded together to form the fibrous nonwoven web layer, and these individually produced layers may differ in terms of production method, basis weight, composition, and fibers as discussed above.

Once the desired configuration and materials of the first sheet layer and second sheet layer have been selected, the first and second sheet layers are bonded together along at least a substantial portion of the periphery of the mitt, except leaving one open end for finger insertion, to form the hollow member. These bonds along the periphery of the mitt can form the bond lines or seams of the mitt. As stated, the hollow member should be large enough to allow for insertion of two or more fingers into the treating device. The first and second sheet layer may be bonded together by any known methods, such as for example by stitch bonding, thermal bonding in points or in lines, ultrasonic bonding or adhesive bonding. It may be desirable for the treating device to be configured such that the proximal end of the device (the end nearest the user's hand, i.e., the open end of the device where the fingers begin insertion) is somewhat wider than the distal end of the device (the end nearest the tips of the user's finger when the device is worn).

Other suitable mitts for forming an all in one treating device are disclosed in U.S. Publication No. 2005/0241089, which is incorporated by reference in its entirety.

Figure 2:
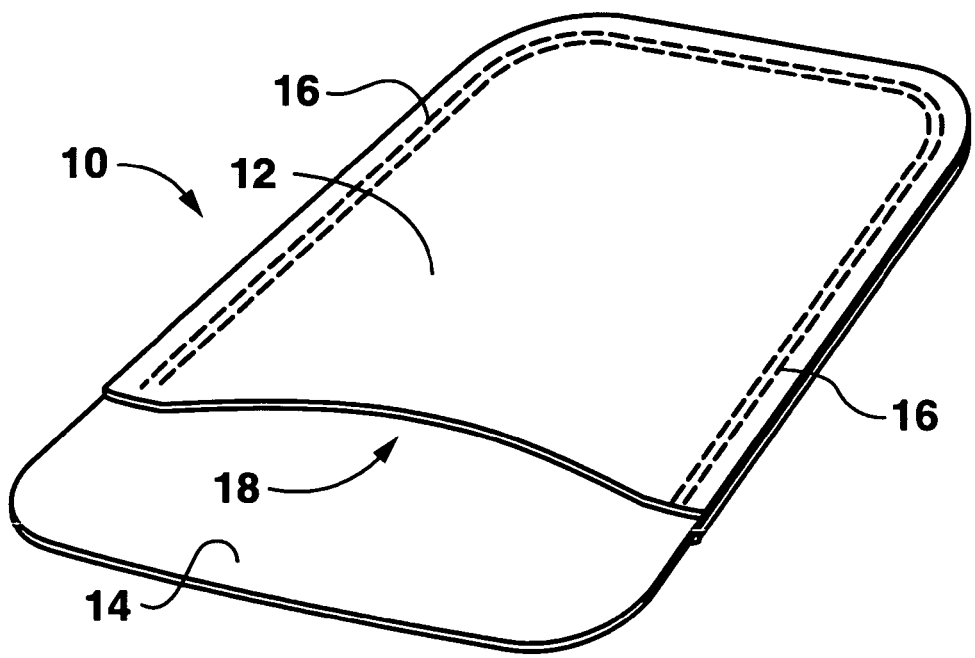
FIG. 2 is a representation of the opposite side of the all in one treating device of FIG. 1.
Figure 3:
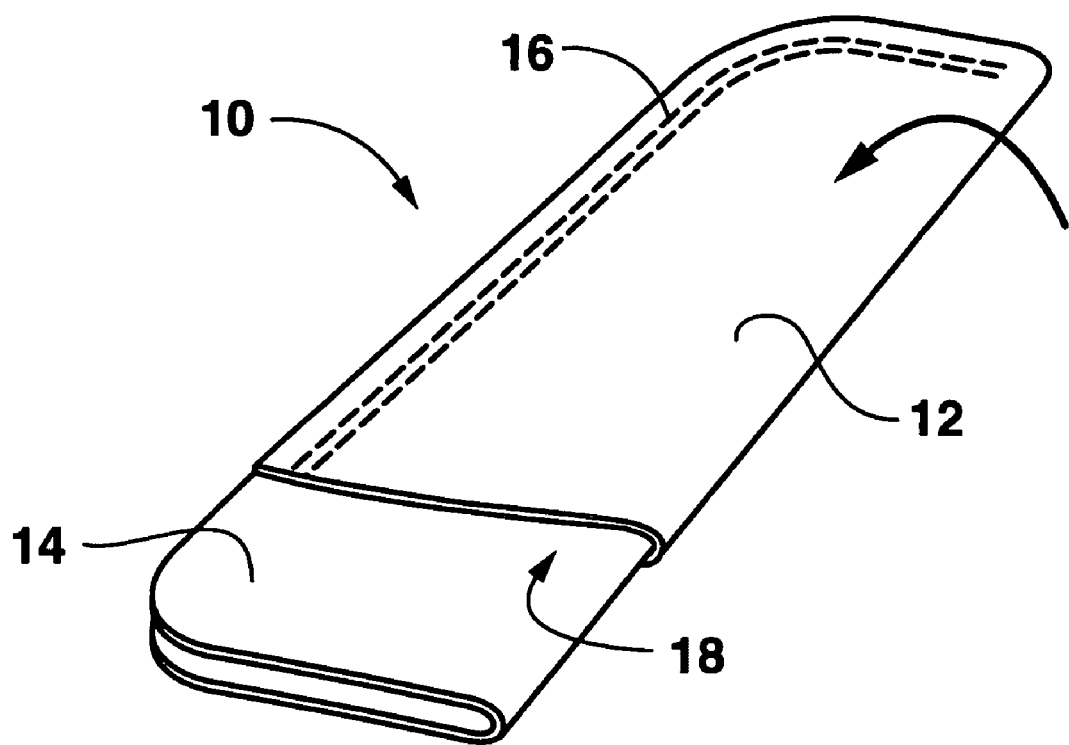
FIG. 3 is a representation of the all in one treating device of FIG. 1 in a folded manner.

Turning to FIGS. 1-3, one particular embodiment of an all in one treating device is shown. A hollow member 10 has a first sheet layer 12 and a second sheet layer 14. The first sheet layer 12 is bonded to the second sheet layer 14 about the periphery at bond lines 16 to form the hollow member 10. One side of the hollow member 10 is left unbonded at open end 18 for the insertion of the fingers of a user. The second sheet layer 14 defines an outside surface 20 that is configured for polishing, cleaning, rubbing, etc. the surface to be polished. As such, a polish can be applied or impregnated into the outside surface 20 of the second layer 14.

In the embodiment shown, the outside surface 20 of the second sheet layer 14 defines a delivery zone 22 for the application of the polish. In one embodiment, the delivery zone 22 is simply a portion of the outer layer of the second sheet layer 14 where the polish is applied. In this embodiment, the delivery zone 22 cannot be distinguished from the rest of the outer layer of the second sheet layer 14 until the polish is applied, creating the delivery zone 22. Alternatively, the delivery zone 22 can be a separate layer bonded to the outside surface 20.

The layers of the hollow member 10 can be constructed in any manner, as discussed above. In one particular embodiment, however, the first sheet layer 12 can be a neck-bonded laminate coated on its inside surface with a non-slip feature, as described above. The neck-bonded laminate can have a sheet weight of from about 3.5 ounces per square yard (osy) to about 4.5 osy, such as from about 3.9 osy to about 4 osy. The second sheet layer 14 can be a high-loft spunbond web of bicomponent polypropylene/polyethylene side-by-side fibers laminated to a film, or a film laminate, of high density polyethylene on the inside surface. The spunbond web can have a sheet weight of from about 2.5 osy to about 3.5 osy, such as about 2.75 osy to about 3 osy. The film can have a thickness of about 2 mils. The first sheet layer 12 and the second sheet layer 14 can be ultrasonically bonded at seams 16.

In one embodiment, an applicator coating can be applied onto the outer surface of the dry mitt prior to the application of the polish. The applicator coating can be configured to inhibit the wicking or migration of any polish applied to it, even if the viscosity of the polish is relatively low, such as less than about 50,000 cps or less than about 30,000. In one embodiment, for instance, the applicator layer can include a polytetrafluoroethylene compound, such as Scotch-Guard (3M Corp., St. Paul, Minn.). For example, an applicator coating can be applied to the entire outer surface or only to a delivery zone of the outer surface. Then, a polish can be applied to the coated application surface. Alternatively, an internal additive may be used in the polymer melt forming the fibers of the outer surface, to impart desired additional hydrophobicity or liquid repellency to the outer surface. Exemplary liquid repellency additives include fluorocarbon compounds capable of being added to the polymer melt. Desirably, the liquid repellency internal additive is present in an amount from about 0.1 weight percent to about 2 weight percent, and more desirably in an amount from about 0.25 to about 1.0 weight percent. As an example, the fluorocarbon compounds disclosed in U.S. Pat. Nos. 5,145,727 and 5,149,576 to Potts et al., herein incorporated by reference, and in U.S. Pat. No. 5,178,931 to Perkins et al., herein incorporated by reference, are well suited to providing liquid repellency properties to fibrous web materials such as nonwoven fabrics.

Alternatively, in one particular embodiment, an applicator coating can be applied as a border surrounding the delivery zone, where the polish is to be applied, to act as a boundary preventing the polish from migrating out of the delivery zone. This particular embodiment can minimize the amount of applicator coating present on the outer surface, which is preferable not only from a cost savings view point but also from an environmental standpoint, especially when using an applicator coating that includes a polytetrafluoroethylene compound.

The all in one treating device impregnated with a polish can be placed in various packaging materials, such as film or foil packets, film foil laminates, metalized films, multi-layered plastic films, and the like after manufacture and prior to being shipped and sold. Such packaging is desirable to help preserve the materials used in the manufacture of the treating device and also to further help preserve the treating composition impregnated on the fibrous nonwoven web layer of the second sheet layer. Furthermore, the treating device may be provided in individual packaging. However, whether provided as individual treating devices or as a plurality, it may be desirable to avoid contacting non-impregnated portions of the treating device with the treating composition, or inadvertent contact of the composition with packaging materials or fingers or surfaces the user does not intend to contact. Therefore, it may be desirable to provide the treating device in a folded configuration such that the delivery zone is folded in face-to-face relation upon itself. Returning briefly to FIG. 3 for purposes of illustration, this may be accomplished by folding the fibrous nonwoven web layer upon itself approximately along a line parallel to the longitudinal midline.

Alternatively, the fibrous nonwoven web layer may be folded upon itself along a transverse line approximately halfway down the length extent of the delivery zone. As still another alternative, and particularly where the delivery zone is small compared to the non-impregnated portion of the treating device, the fibrous nonwoven web layer may be folded upon itself along a transverse line near the bottom of the length extent of the delivery zone. In this case, although a certain amount of the treating composition may flow onto the non-impregnated portion under the folded area, a substantial remainder of the non-impregnated portion will still remain free of treating composition.

EXAMPLES

In each of the following Examples, a polish was applied to a mitt. The base polish was provided by Pedag USA, Inc. (Seattle) under the trade name Deluxe Cream Polish.

The mitt had a first sheet layer constructed of a neck-bonded laminate coated on its inside surface with a non-slip adhesive. The neck-bonded laminate had a sheet weight of about 3.95 osy and was constructed of a necked film layer of ethylene-octene copolymer resin (available from Dow Chemical Co. of Midland, Mich. under the trade name AFFINITY EG 8200) between two outer layers of polypropylene spunbond webs. The second sheet layer was constructed of a high-loft spunbond web of bicomponent polypropylene/polyethylene fibers with a side-by-side orientation laminated to a film of high density polyethylene on the inside surface. The spunbond web had a sheet weight of about 2.9 osy. The film had a thickness of about 2 mils. The first sheet layer and the second sheet layer were ultrasonically bonded leaving an opening for the insertion of two fingers (such as at seams 16 of FIGS. 1-3).

Example 1

Several different chemicals were tested to determine their ability to inhibit mold growth in a polish that has been applied to a mitt. For example, chloroacetamide, polyaminopropyl biguanide available under the name Cosmocil CQ from ICI Americas Inc., organosilicone quaternary ammonium compound available under the name AEM 5700 from Dow Chemical by Aegis Environmental Management (Midland, Mich.), a combination of combination of isothiazolones and N-/O-formals available under the name Parmetol DF35 from Schulke & Mayr, and methylparaben were each added to a base polish sample. The resulting polish samples were then applied to mitts. The ability of the polish to inhibit mold growth for each sample was then compared. Both the methylparaben and the propanoic acid samples inhibited growth of mold better than the other tested chemicals, and at lower add-on levels, with the methylparaben having the best results of all samples.

Example 2

The inhibition of wicking of the polish on the mitt was tested by adding Solagum® to the base polish at varying amounts. Then, the modified polish was applied to the mitt at the delivery zone. To test for wicking capability, an accelerated wicking test was utilized. The accelerated wicking test involved preparing the finished all in one treatment device, packaging the all in one treatment device in a foil pouch, and sealing the package. The all in one treatment device was folded, as shown in FIG. 3, prior to packaging in the sealed foil pouch. The package was then placed under 30 lbs. of direct weight for a minimum of three hours. The 30 lbs. weight had a surface area sufficient to contact the entire sealed package but no other surface. As such, the entire 30 lbs was substantially evenly distributed on the sealed package.

After the accelerated wicking test was completed, each package was opened and visually inspected to determine the extent, if any, that the polish migrated or wicked from the initial delivery zone. The polish samples having higher viscosities did not wick under the weight.

Example 3

The inhibition of wicking of the polish on the mitt was tested by coating the applicator surface of the $2^{nd}$ sheet layer of the mitt with a layer of Scotch-Guard®. The Scotch-Guard® layer was coated on the outer surface by spraying, and thereafter allowed to dry. Then, the base polish, without modification, was applied to the coated applicator surface. The accelerated wicking test described in Example 2 was utilized and indicated that the polish did not substantially migrate or wick into the bonded seams, unlike a previous sample without the Scotch-Guard® layer.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. An all in one treating device comprising
a hollow member having an open end adapted for the insertion of one or more fingers, said hollow member defining between a first sheet layer and a second sheet layer, said first sheet layer comprising an elastic layer, and said second sheet layer comprising a fibrous nonwoven web layer having an outer surface;
a polish applied to a delivery zone on said outer surface of said fibrous nonwoven web, wherein said polish comprises a preservative configured to inhibit the growth of mold, wherein said preservative is present in said polish in an amount of about 1% by weight to about 5% by weight; and
an applicator coating applied to at least a portion of said outer surface prior to application of the polish which inhibits wicking or migration of the polish from the delivery zone.

2. An all in one treating device as in claim 1, wherein said preservative comprises a paraben.

3. An all in one treating device as in claim 1, wherein said preservative comprises methylparaben.

4. An all in one treating device as in claim 1, wherein said preservative comprises an alkanoic acid.

5. An all in one treating device as in claim 1, wherein said preservative comprises propanoic acid.

6. An all in one treating device as in claim 1, wherein said polish further includes a viscosity modifier in an amount sufficient to modify the viscosity of said polish to be between about 30,000 cps to about 150,000 cps.

7. An all in one treating device as in claim 6, wherein said viscosity modifier comprises an acrylamide.

8. An all in one treating device as in claim 1, wherein said applicator coating comprises a polytetrafluoroethylene compound.

9. An all in one treating device as in claim 1, wherein the applicator coating is applied as a border surrounding the delivery zone.

10. An all in one treating device as in claim 1, wherein the applicator coating is applied over the delivery zone.

11. An all in one treating device comprising
a hollow member having an open end adapted for the insertion of one or more fingers, said hollow member defining between a first sheet layer and a second sheet layer, said first sheet layer comprising an elastic layer, and said second sheet layer comprising a fibrous nonwoven web layer having an outer surface; and
a polish applied to a delivery zone on said outer surface of said fibrous nonwoven web, wherein said polish includes at least one wax, a viscosity modifier, and a preservative configured to inhibit the growth of mold, wherein said preservative is selected from the group consisting of parabens and alkanoic acids, wherein said preservative is present in said polish in an amount of about 1% by weight to about 5% by weight, and wherein said viscosity modifier is present in an amount sufficient to modify the viscosity of said polish to be between about 30,000 cps to about 150,000 cps.

12. An all in one treating device as in claim 11, wherein said preservative comprises methylparaben.

13. An all in one treating device as in claim 11, wherein said preservative comprises propanoic acid.

14. An all in one treating device as in claim 11, wherein said polish has a viscosity of about 70,000 cps to about 100,000 cps.

15. A shoe polish comprising
at least one wax;
an acrylamide viscosity modifier present in the shoe polish in an amount sufficient to modify the viscosity of the shoe polish to be between about 30,000 cps and 150,000 cps; and
a preservative configured to inhibit the growth of mold, wherein said preservative comprises a paraben; wherein said preservative is present in the shoe polish in an amount of between about 1% by weight and about 5% by weight.

16. A shoe polish as in claim 15, wherein said paraben comprises methylparaben.

17. An all in one treating device comprising
a hollow member having an open end adapted for the insertion of one or more fingers, said hollow member defining between a first sheet layer and a second sheet layer, said first sheet layer comprising a neck-bonded laminate, and said second sheet layer comprising a fibrous nonwoven web layer having an outer surface laminated to a film layer, wherein said film layer comprises high density polyethylene;
a polish applied to a delivery zone on said outer surface of said fibrous nonwoven web, wherein said polish includes at least one wax, a viscosity modifier, and a preservative configured to inhibit the growth of mold, wherein said preservative comprises a paraben, wherein said preservative is present in said polish in an amount of about 1% by weight to about 5% by weight, and wherein said viscosity modifier is present in an amount sufficient to modify the viscosity of said polish to be between about 70,000 cps and about 100,000 cps; and
an applicator coating applied to at least a portion of said outer surface prior to application of the polish which inhibits wicking or migration of the polish from the delivery zone.

18. An all in one treating device as in claim 17, wherein said paraben comprises methylparaben.

19. An all in one treating device as in claim 17, wherein said preservative is present in an amount of about 2% by weight and about 4% by weight.

20. An all in one treating device as in claim 17, wherein said viscosity modifier comprises an acrylamide.

21. A method of making an all in one treating device comprising
- providing a first sheet layer comprising an elastic layer;
- providing a second sheet layer comprising a fibrous nonwoven web layer having an outer surface;
- joining the first sheet layer to the second sheet layer at bond lines to form a hollow member having an open end;
- applying a polish to a delivery zone on the outer surface of the second sheet layer, wherein the polish includes at least one wax, a viscosity modifier, and a preservative configured to inhibit the growth of mold, wherein the preservative is selected from the group consisting of parabens and alkanoic acids, wherein the preservative is present in said polish in an amount of about 1% by weight and about 5% by weight, and wherein the viscosity modifier is present in an amount sufficient to modify the viscosity of said polish to be between about 30,000 cps and about 150,000 cps; and
- applying an applicator coating to at least a portion of said outer surface prior to application of the polish which inhibits wicking or migration of the polish from the delivery zone.

* * * * *